United States Patent Office 2,886,054
Patented May 12, 1959

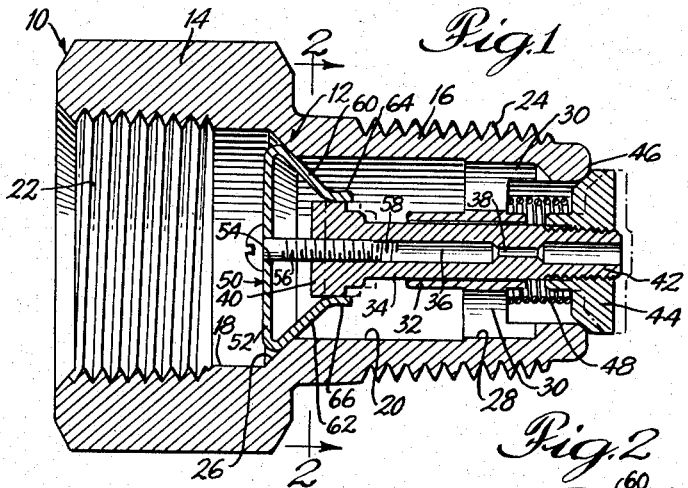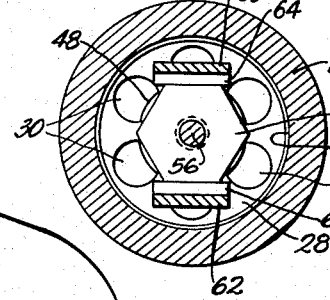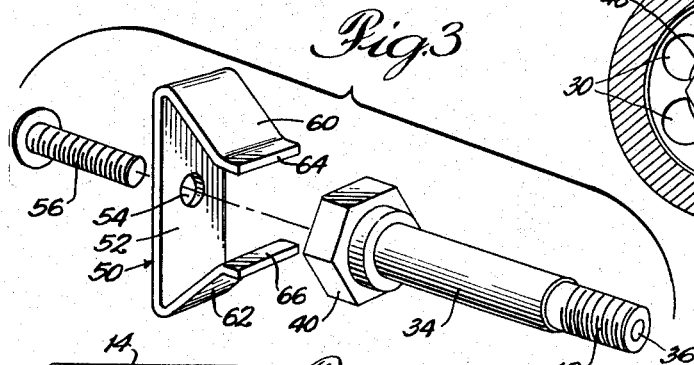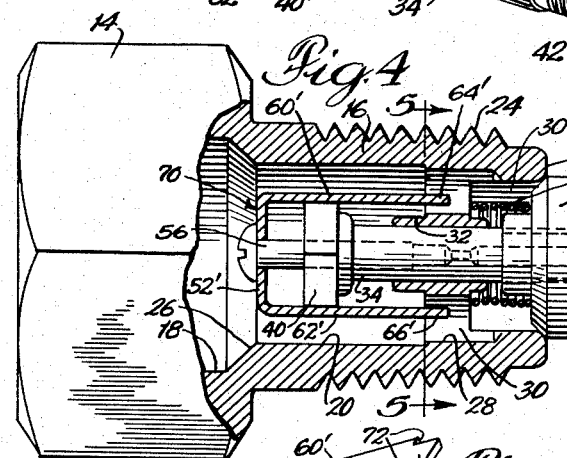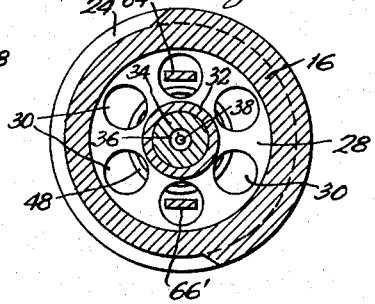

2,886,054

EXCESS FLOW VALVE WITH KEEPER MEANS

Peter A. Smith and Philip L. Johnson, Marshalltown, Iowa, assignors to Fisher Governor Company, a corporation of Iowa Application July 1, 1957, Serial No. 669,188

6 Claims. (Cl. 137—316)

This invention relates generally to an excess flow valve construction, and more particularly to an improved keeper device therefor.

In liquefied petroleum gas systems, such as those employing a storage tank of liquefied propane and butane gases, it is often necessary to provide a supplemental outlet or supply means. Such outlets require excess flow check valve structures therein for insuring regulated supply flow therethrough. Ordinarily, when a liquefied petroleum gas tank is first installed, the user has no immediate need for the supplemental outlet which is customarily provided, but such outlets are desirable in order to permit possible future expansion of the installed system. For example, initial installation may be for domestic home heating uses only, and it may become desirable at some later date to also supply gas from the same tank to others using appliances or equipment. In practice, such supplemental use requirements may not be necessary until as long as several years following initial installation of the tank.

When it becomes necessary to "unplug" a supplemental outlet connection and add a new user coupling for supply of gas to a newly added point of use, it is very important to insure utmost safety and complete control of gas flow through the excess flow check valve of the outlet connection until the new line couplings are completed.

In order to provide a safety feature for insuring full control of the excess flow check valve until coupling manipulations have been completed in connecting a previously closed outlet connection to a new user line, it has been suggested in the past to provide "keeper" means of various forms. The primary object of the present invention is to provide a new and improved keeper means for use with an excess flow valve device.

It is another object of this invention to provide a disposable keeper means of simple and low cost construction, having a minimum number of parts, and requiring no special tools for its use and removal.

It is a further object of this invention to provide keeper means of the type described, which is operative to prevent relative rotation between the excess flow check valve parts during its removal, and which enables immediate detection of minor and non-hazardous gas leakage prior to its full removal and prior to full release of the excess flow check valve.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing, in which:

Figure 1 is a longitudinal cross sectional view taken through an excess flow check valve embodying the improved keeper means of the present invention;

Figure 2 is a transverse cross sectional view taken substantially as indicated along the line 2—2 on Figure 1;

Figure 3 is an exploded view, in perspective, illustrating the cooperative assembly relation between the keeper parts and the excess flow check valve stem;

Figure 4 is a longitudinal cross sectional view similar to Figure 1, showing a modified form of keeper retainer;

Figure 5 is a transverse cross sectional view taken substantially as indicated along the line 5—5 on Figure 4; and Figure 6 is a perspective view illustrating the modified keeper retainer employed in the construction shown in Figures 4 and 5.

Referring now more particularly to Figure 1 of the drawing, we have indicated generally at 10 an excess flow check valve assembly of the type adapted to be mounted in an outlet connection of a liquefied petroleum gas system. The assembly 10 comprises a generally hollow body member 12 of unitary form. The body 12 provides an enlarged head portion 14 at its one end, outwardly relative to an associated storage tank, and a connector portion 16 of reduced diameter extending relatively inwardly therefrom. The head 14 defines an enlarged bore 18 communicating with a bore 20 formed within the connector 16. The bore 18 is internally screw threaded for receiving a suitable solid closure plug adapted to effect gas tight sealing of the bore 18. The connector 16 is externally screw threaded at 24 for mounting cooperation with a suitable fitting of a storage tank wall or a cooperating portion of a multiple valved head structure.

A frusto-conical wall portion 26 is defined between the relatively larger outer bore 18 and the relatively smaller inner bore 20. A transverse spider wall 28 extends integrally across the connector 18 adjacent its inner open end. The wall 28 defines a plurality of bores or flow openings 30. A tubular mounting boss 32 is formed integrally with the wall 28 and extends outwardly from the center thereof.

A valve stem member 34 is axial slidably received within the mounting boss 32. A weep hole or bore 36 extends longitudinally through the full length of the stem 34. A restriction or throttle passage 38 is provided intermediate the open ends of the bore 36. The outward end of the stem 34 is formed with an enlarged head portion 40 of non-circular form, and shown as hex-sided in the drawing. The inward end of the stem 34 is externally screw threaded and serves to mountingly support a poppet valve 44 thereon. The inner terminal end of the connector 16 is annularly rounded to define a valve seat 46 for sealing cooperation with the poppet valve 44. A coil spring 48 is disposed in compression between the spider wall 28 and the poppet valve 44. In this way, the poppet valve 44 is normally biased away from the valve seat 46 toward an open flow position, for dispensing gas from a tank outwardly through the bores 20 and 18 to a point of use. Upon excess rate of flow, the spring force will be overcome by the flow pressure and the poppet will close until the pressures are once again equalized for normal rate of flow.

The present invention is particularly directed to a novel keeper means for use with the excess flow check valve assembly thus far described. The keeper means comprises only two parts. The first is a retainer or clip 50 having a generally flat transverse portion 52 defining parallel straight side edges. A central aperture 54 is formed to receive therethrough the second part of the keeper means, which is a common round-head machine screw 56.

The weep hole 36 of the valve stem 34 is internally screw threaded at the enlarged head end to cooperatingly receive the threaded shank of the keeper screw 56. In this way, the screw 56 serves to effect a gas-tight closure of the weep hole 36, and prevents flow therethrough until it is fully removed.

The retainer 50 is formed with inwardly tapering wings 60 and 62, at its opposite ends. The wings are generally flat and straight-sided, and terminate in a pair of generally parallel gripping flanges 64 and 66, respectively. The entire retainer 50 is formed from a single strip of suitable sheet metal material.

As is best seen in Figure 1 of the drawing, the retainer 50 nests within the bores 18 and 20 of the valve body. The gripping flanges 64 and 66 engage against opposite flat sides of the enlarged head 40 of the valve stem, as best seen in Figure 2 of the drawing. In this way, relative rotation of the retainer 50 and the stem 34 is prevented during rotation of the screw 56 within the weep hole 36. The wings 60 and 62 taper at angles generally the same as the angle of the frusto-conical wall portion 26 so as to enable fitting engagement thereagainst. The frictional engagement of the wings 60, 62 and wall portion 26 is such as to preclude relative rotation therebetween. This frictional engagement together with the non-rotatable engagement of the gripping flanges 64, 66 with the valve stem provides for removal of the screw 56 without relative movement of the valve parts.

The practical operation of the structure of the present invention will now be described. Assuming that the excess flow check valve is in mounted relation within an outlet connection of a liquefied petroleum gas storage tank, the sealing plug which normally lies within the threaded bore 18 of the valve body will be first removed by the serviceman. This will serve to expose the keeper means therebelow. By means of an ordinary screwdriver, the screw 56 may be rotated to loosen the keeper retainer 50 and permit the spring 48 to move the valve stem 34 in an inward direction toward the tank interior. If the vapor pressure within the live gas tank is sufficiently low, as for example in the range of 5–10 p.s.i., the biasing force of the spring 48 will be sufficient to oppose the gas pressure against the poppet valve 44 and effect its movement away from the valve seat 46 as the keeper screw 56 is turned. The flat sides of the valve stem head 40 will slide inwardly along the gripping flanges 64 and 66 of the retainer 50, and the force of spring 48 will maintain the wings 60 and 62 of the retainer 50 in engagement within the tapered wall 26 of the valve body.

It will be apparent that as soon as the keeper screw 56 has been rotated sufficiently to permit slight unseating of the poppet valve 44, gas from within the storage tank will be permitted to leak outwardly about the poppet valve 44 through the spider ports 30, and valve body bores 20 and 18. Such escaping gas can be immediately detected by the serviceman, because of odor, sound, and sight, and the keeper screw 56 quickly re-tightened to again effect a gas tight fitting of the poppet valve 44. It will be apparent that control over the poppet valve is not relinquished as removal of the keeper means is initiated, thereby enabling the slightest gas leakage to be immediately detected in sufficient time to permit immediate re-sealing of the parts before a hazard is created.

If, however, a normal vapor pressure exists in the storage tank, in excess of about 20 p.s.i., the gas pressure itself will serve to maintain the poppet valve 44 seated upon the valve seat 46 against the opening bias of the spring 48. The screw 56 of the keeper means may then be fully removed, without any rotation of the valve parts or other movement thereof which might tend to cause unseating of the poppet valve.

When the screw 56 has been fully removed, the weep hole 36 will be open, and small leakage of gas will occur, indicating satisfactory conditions to the serviceman. The keeper means parts 56 and 50 are then discarded, and a positive downstream shut-off means, such as a globe valve or the like, is threaded into the bore 18, pending completion of the necessary other connections for securing the outlet connection to the new demand outlet or point of use.

Referring now more particularly to Figures 4 to 6 of the drawing, there is illustrated a construction employing a keeper retainer of modified form. This alternative type of retainer is indicated generally at 70, all other parts of the keeper means and excess flow valve unit being identical with those described above in connection with Figures 1 to 3 of the drawing, and having been designated with the same reference numerals in Figures 4 to 6. The modified retainer or clip 70 provides a generally flat transverse portion 52' defining parallel straight side edges, and having a central aperture 54' to receive the cooperating keeper screw 56. Wings 60' and 62' extend from the transverse portion 52' at right angles and in parallel coextensive relation. The ends of the wings terminate in reduced key flanges 64' and 66'. The entire retainer 70 is formed from a single strip of suitable sheet metal material, in the manner of the keeper 50 of Figures 1 to 3.

As best seen in Figures 4 and 5 of the drawing, the retainer 70 is disposed substantially entirely within the valve body bore 20 in spaced relation to the wall thereof. The key flanges 64' and 66' are adapted to be received within opposite flow openings 30 of the transverse spider wall 28. Because of the reduced size of the key flanges, and because the width of the wings 60' and 62' is selected slightly larger than the diameter of the openings 30, pairs of abutment shoulders or ledges 72 and 74 are defined adjacent the key flanges 64' and 66', respectively. The pairs of abutment ledges 72 and 74 provide stop limits for entry of the key flanges 64' and 66' into the flow openings 30 while effecting seated engagement upon the adjacent surfaces of spider wall 28. The length of the wings 60' and 62' and the location of the ledges 72 and 74 is selected so that the transverse wall portion 52' will be spaced above the head portion 40 of the valve stem 34, when the keeper screw 56 is screwed into the weep hole 36 to effect locking assembly of the parts.

It will be apparent that the modified form of the retainer 70 engages the opposite flat sides of the valve stem head 40 in an axially slidable but non-rotatable relation. In addition, the key flanges 64' and 66' operate both as positioning elements and as stops against relative rotary movement between the parts. It will be understood that the practical operation of this modified form of construction is substantially identical with that already described in connection with the structure of Figures 1 to 3.

The keeper means of the present invention is of simple and low cost construction, requiring only two parts and requiring no special tools or equipment for its removal and operating use. The keeper means of the present invention prevents rotation of the valve stem and avoids any relative movement between the valve parts as it is removed. Immediate leakage detection indicating an inadequate tank pressure is possible prior to the creation of any major hazard and prior to full removal of the keeper means, thereby enabling prompt re-connection of the parts and sealing of the valve.

While there has been shown and described a particular embodiment of this invention, it will be obvious to those skilled in the art that various changes and modifications may be made therein without departing from the invention, and, therefore, it is intended in the appended claims to cover all such changes and modifications as fall within the true spirit and scope of the invention.

What we claim as new and desire to secure by Letters Patent of the United States is:

1. An excess flow valve for use in a liquefied gas system, said valve comprising a body member defining a bore therethrough having an inlet end for communication with a source of liquefied gas under pressure and an outlet end for discharge flow, said body defining a seating abutment intermediate its ends, a valve stem axially slidably carried by said body within said bore and terminating at its one end in a poppet valve adapted to close the bore inlet end, biasing means urging said poppet valve toward an open flow position, said valve stem having a bore extending axially therethrough, and keeper means including a retainer and a connector, said retainer providing stop means axially engaging said seating abutment to define a limiting inward position of said retainer, said retainer further providing spaced opposed portions slidably and non-rotatably engaging said valve stem, said connector serving to removably interconnect said retainer and said valve stem and extending into said valve stem bore for closure thereof.

2. An excess flow valve for use in a liquefied gas system, said valve comprising a body member defining a bore therethrough having an inlet end for communication with a source of liquefied gas under pressure and an outlet end for discharge flow, said body defining a seating abutment intermediate its ends, a valve stem axially slidably carried by said body within said bore and terminating at its one end in a poppet valve adapted to close the bore inlet end, biasing means urging said poppet valve toward an open flow position, said valve stem having a bore extending axially therethrough, said bore being screw-threaded toward the outlet end, and keeper means including a retainer and a screw-threaded connector, said retainer having a transverse portion providing stop means axially engaging said seating abutment to define a limiting inward position of said retainer, and a pair of wing portions projecting therefrom slidably and non-rotatably engaging said valve stem, said connector extending through said retainer and screw-threadedly into said valve stem bore for removably interconnecting said retainer and valve stem and closing said valve stem bore.

3. An excess flow valve for use in a liquefied gas system, said valve comprising a body member defining a bore therethrough having an inlet end for communication with a source of liquefied gas under pressure and an outlet end for discharge flow, said body bore defining a seating abutment intermediate its ends, a valve stem axially slidably carried by said body within said bore and terminating at its one end in a poppet valve adapted to close the bore inlet end, biasing means urging said poppet valve toward an open flow position, said valve stem having a bore extending axially therethrough, and keeper means including a retainer and a connector, said retainer having a transverse portion extending across the bore of said body for seating against said abutment and having a pair of convergingly inclined gripping portions projecting therefrom for slidably and non-rotatably engaging said valve stem, said connector serving to removably interconnect said retainer and said valve stem and extending into said valve stem bore for closure thereof.

4. An excess flow valve for use in a liquefied gas system, said valve comprising a body member defining a bore therethrough having an inlet end for communication with a source of liquefied gas under pressure and an outlet end for discharge flow, said body bore defining a transverse spider wall intermediate its ends, a valve stem axially slidably carried within said bore by said spider wall and terminating at its one end in a poppet valve adapted to close the bore inlet end, biasing means urging said poppet valve toward an open flow position, said valve stem having a bore extending axially therethrough, and keeper means including a retainer and a connector, said retainer having a transverse portion and a pair of parallel wing portions projecting therefrom for slidably and non-rotatably engaging said valve stem and abutting against said spider wall, said connector serving to removably interconnect said retainer and said valve stem and extending into said valve stem bore for closure thereof.

5. An excess flow valve for use in a liquefied gas system, said valve comprising a body member defining a bore therethrough having an inlet end for communication with a source of liquefied gas under pressure and an outlet end for discharge flow, said body bore defining a seating abutment intermediate its ends, a valve stem axially slidably carried by said body within said bore and terminating at its one end in a poppet valve adapted to close the bore inlet end, biasing means urging said poppet valve toward an open flow position, said valve stem providing a flat-sided head at its other end, said valve stem having a bore extending axially therethrough, and keeper means including a retainer and a connector, said retainer having a transverse portion extending across the bore of said body and providing stop means axially engaging said seating abutment to define a limiting inward position of said retainer, said retainer further providing a pair of convergingly inclined wings projecting therefrom and terminating in parallel flat gripping flanges slidably and non-rotatably engaging opposite flat sides of said valve stem head, said connector serving to removably interconnect said retainer and said valve stem and extending into said valve stem bore for closure thereof.

6. An excess flow valve for use in a liquefied gas system, said valve comprising a body member defining a bore therethrough having an inlet end for communication with a source of liquefied gas under pressure and an outlet end for discharge flow, said body bore defining a transverse spider wall intermediate its ends having a plurality of flow ports extending therethrough, a valve stem axially slidably carried within said bore by said spider wall and terminating at its one end in a poppet valve adapted to close the bore inlet end, biasing means urging said poppet valve toward an open flow position, said valve stem providing a flat-sided head at its other end, said valve stem having a bore extending axially therethrough, and keeper means including a retainer and a connector, said retainer having a transverse portion and a pair of parallel wing portions projecting therefrom and terminating in reduced key portions extending into corresponding flow ports of said spider wall, said wing portions slidably and non-rotatably engaging opposite flat sides of said valve stem gripping head and abutting against said spider wall, said connector serving to removably interconnect said retainer and said valve stem and extending into said valve stem bore for closure thereof.

References Cited in the file of this patent
UNITED STATES PATENTS

| | | |
|---|---|---|
| 342,801 | Maines et al. | June 1, 1886 |
| 503,787 | Doty | Aug. 22, 1893 |
| 675,791 | Randolph | June 4, 1901 |
| 1,115,244 | Reynolds | Oct. 27, 1914 |
| 2,591,514 | Courtot | Apr. 1, 1952 |